US007962996B1

(12) United States Patent  (10) Patent No.: US 7,962,996 B1
Mondello  (45) Date of Patent: Jun. 21, 2011

(54) MOBILE YARD VACUUM CART FOR USE WITH HAND-HELD LEAF BLOWERS

(76) Inventor: Jack Mondello, Staten Island, NY (US)

( * ) Notice: Subject to any disclaimer, the term of this patent is extended or adjusted under 35 U.S.C. 154(b) by 0 days.

(21) Appl. No.: 12/660,787

(22) Filed: Mar. 4, 2010

(51) Int. Cl.
*A47L 9/10* (2006.01)
(52) U.S. Cl. .................. 15/347; 15/352; 15/360
(58) Field of Classification Search .............. 15/347, 15/352, 323, 327.1, 354, 360, DIG. 8; 55/DIG. 2, 55/DIG. 3
See application file for complete search history.

(56) References Cited

U.S. PATENT DOCUMENTS

| | | | |
|---|---|---|---|
| 2,824,335 A * | 2/1958 | Moffat | 15/345 |
| 3,903,565 A | 9/1975 | Hicks | |
| 4,567,623 A * | 2/1986 | Walton | 15/337 |
| 4,713,858 A | 12/1987 | Kelber | |
| 4,723,971 A * | 2/1988 | Caldas | 96/385 |
| 4,941,231 A * | 7/1990 | Jarosak | 15/328 |
| 5,058,235 A | 10/1991 | Charky | |
| 5,354,347 A * | 10/1994 | McCoy et al. | 96/330 |
| 5,445,398 A | 8/1995 | Pierce | |
| 6,170,118 B1 | 1/2001 | McIntyre et al. | |
| 6,574,829 B1 | 6/2003 | Marcum et al. | |
| 7,257,858 B2 | 8/2007 | Palazzolo | |
| 7,506,403 B2 * | 3/2009 | Svoboda et al. | 15/347 |
| 7,752,706 B2 * | 7/2010 | Goodger | 15/327.4 |

* cited by examiner

*Primary Examiner* — Dung Van Nguyen
(74) *Attorney, Agent, or Firm* — Goldstein Law Offices PC

(57) ABSTRACT

A mobile yard vacuum cart that incorporates a leaf blower and trash can into a vertical support assembly that allows an operator to collect leaves into the trash can for disposal simultaneously while moving the mobile yard vacuum cart across a lawn without lugging the leaf blower. The mobile yard vacuum cart has a vertical support assembly, a pickup assembly, a discharge assembly and a strap assembly. The coupling of the leaf blower with the pickup assembly allows the operator to simply push the mobile yard vacuum cart without having to simultaneously manipulate a blower intake tube across the lawn surface. If the leaf blower has a chopping impeller blade, the mobile yard vacuum cart advantageously directs the leaves into the impeller of the leaf blower for chopping. The mobile yard vacuum cart provides adaptors in a variety of configurations to couple the tubes supplied with the leaf blower.

13 Claims, 3 Drawing Sheets

MOBILE YARD VACUUM CART FOR USE WITH HAND-HELD LEAF BLOWERS

BACKGROUND OF THE INVENTION

The invention relates generally to a mobile yard vacuum cart for use with hand-held leaf blowers. More particularly, the invention relates to a wheeled mounted vacuum and trash can cart that allows any hand-held leaf blower to be easily attached for collecting leaves, grass clippings, and other lawn debris from a yard.

Deciduous trees with their leafy boughs enhance the beauty of suburban property. As sure as they cast off their snowy coats in the winter, budding in the spring to produce the summer's shade, so too must the colorful autumn leaves inevitably fall. The fallen leaves create a formidable task for the homeowner of raking, bagging, and possibly mulching or disposing of these leaves. Trees contribute other debris that must be disposed properly, such as acorns, tree nuts, and seed pods. Leaving the leaves and debris in place causes future problems. Tree leaf mold, a common allergen, grows quickly, creating health issues for the people in the neighborhood. The mold sometimes spreads to plants below. Thick layers of entire leaves, especially of maples and oaks, can form a soggy mat in winter and spring which can impede the new growth of lawn grass and other plants. Generally, lawn clean up becomes a necessary, time-consuming, and often strenuous task.

The homeowner can choose from a simple rake to the high-powered tractor for the cleanup. When the homeowner uses a rake, he or she must move all the leaves and debris into large piles, place the waste materials into bags and move the bags either to the curb or to a designated municipal dump or conservation center. If the homeowner decides to use a leaf blower, he or she still is required to create large piles of leaves and debris, place the materials into bags and move the bags. While leaf blowers are relatively light in weight, carrying them around the yard, slung on a shoulder or held in hand, rapidly becomes tiring. The leaf blower does not assist in placing the leaves in bags, which remains a manual operation.

For those whose yard or lawn is measured in acres, they have the option of using various carts and wheeled bagging devices that attach to tractors, riding mowers and even golf carts. However, for the homeowner whose property measures in a fraction of an acre, these types of riding equipment are not economical or practical.

Most leaf blower can operate in a blower mode and a vacuum mode, depending on whether the homeowner is using a fan exhaust as a blower or a fan intake as a vacuum. When the equipment is used as a blower, the homeowner accumulates leaves in large piles. When the leaf blower is used as a vacuum, the leaves often time pass through the impeller blades of the fan before moving into a collection container. Along with collecting leaves, the impeller blades chop the leaves into smaller pieces for mulching and composting.

When the homeowner uses the leaf blower as a vacuum, often a bag is attached to the discharge tube to catch the leaves. This adds to the weight of the equipment on the arm or shoulder of the operator. Some have proposed putting wheels on the bag, so that it can be dragged behind the blower operator. Others have proposed an elongated sleeve and shroud that fits over a bin so that the leaves move directly from the discharge tube into a collection container. Still others have proposed lids and other devices to fit on the bin that have a connection to the discharge tube of the leaf blower. However, movement is limited to the area within the radius of the length of tubing connecting the collection container with the leaf blower. The homeowner must stop, pick up and carry or drag the bin while carrying the leaf blower with the extra long tubing to the next area awaiting cleanup. Others have put the bin on wheels or a cart, still requiring the operator to carry the leaf blower while dragging the wheeled bin behind.

People have tried to adapt powerful leaf blowers for vacuuming up not just leaves, grass clippings and other plant debris, but also litter and trash. In addition, the leaf blower is attached to a wheeled bin. However, because this device picks up all types of materials, the device is designed to bypass the impeller and does not mulch or chop plant material. This device still requires the operator to drag the cart with one hand while manipulating the intake tubing to pick up the leaves, debris or litter.

While these units may be suitable for the particular purpose employed, or for general use, they would not be as suitable for the purposes of the present invention as disclosed hereafter.

SUMMARY OF THE INVENTION

It is an object of the invention to produce a mobile yard vacuum cart that does not require an operator to carry a leaf blower by a hand or a shoulder sling. Accordingly, the mobile yard vacuum cart provides a blower support shelf that securely holds the leaf blower during operation.

It is another object of the invention to produce a mobile yard vacuum cart that does not require the operator to carry a collection container attached to the leaf blower. Accordingly, the mobile yard vacuum cart provides a pair of wheels on a vertical support assembly to which the collection container is mounted, so that the collection container is pushed, rather than dragged behind or carried by the operator.

It is a further object of the invention to produce a mobile yard vacuum cart that is easy to use such that the operator can have a free hand. Accordingly, the mobile yard vacuum cart has a crossbar handle that can be pushed with one or two hands without having one hand manipulating an intake tube and other hand pulling a collection container.

It is yet another object of the invention to produce a mobile yard vacuum cart that does not require a collection container to be pulled or dragged behind the operator carrying a leaf blower. Accordingly, the mobile yard vacuum cart provides a support platform for the collection container and a support shelf for the leaf blower in a vertical support assembly that is pushed by the operator.

It is yet a further object of the invention to produce a mobile yard vacuum cart that incorporates an impeller of the leaf blower to chop leaves and plant material. Accordingly, the mobile yard vacuum cart advantageously directs the leaves into a bottom intake tube through the impeller of the leaf blower for chopping.

It is an additional object of the invention to produce a mobile yard vacuum cart that uses equipment that the operator already owns or that can be purchased inexpensively. Accordingly the mobile yard vacuum cart accommodates most household trash cans to use as a collection container and most leaf blowers into a vertical support assembly. The leaf blower can be used regardless of whether it was meant to handheld or carried in a shoulder sling, and whether it is powered by battery, AC current, or other power source.

It is an object of the invention to produce a mobile yard vacuum cart that is only one piece of equipment to manipulate during leaf cleanup. Accordingly, the mobile yard vacuum cart combines the collection container and the leaf blower in the vertical support assembly so that the operator only manipulates the vertical support assembly.

The invention is a mobile yard vacuum cart that incorporates a leaf blower and trash can into a vertical support assembly that allows an operator to collect leaves into the trash can for disposal simultaneously while moving the mobile yard vacuum cart across a lawn without lugging the leaf blower. The mobile yard vacuum cart has a vertical support assembly, a pickup assembly, a discharge assembly and a strap assembly. The coupling of the leaf blower with the pickup assembly allows the operator to simply push the mobile yard vacuum cart without having to simultaneously manipulate a blower intake tube across the lawn surface. If the leaf blower has a chopping impeller blade, the mobile yard vacuum cart advantageously directs the leaves into the impeller of the leaf blower for chopping. The mobile yard vacuum cart provides adaptors in a variety of configurations to couple the tubes supplied with the leaf blower.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
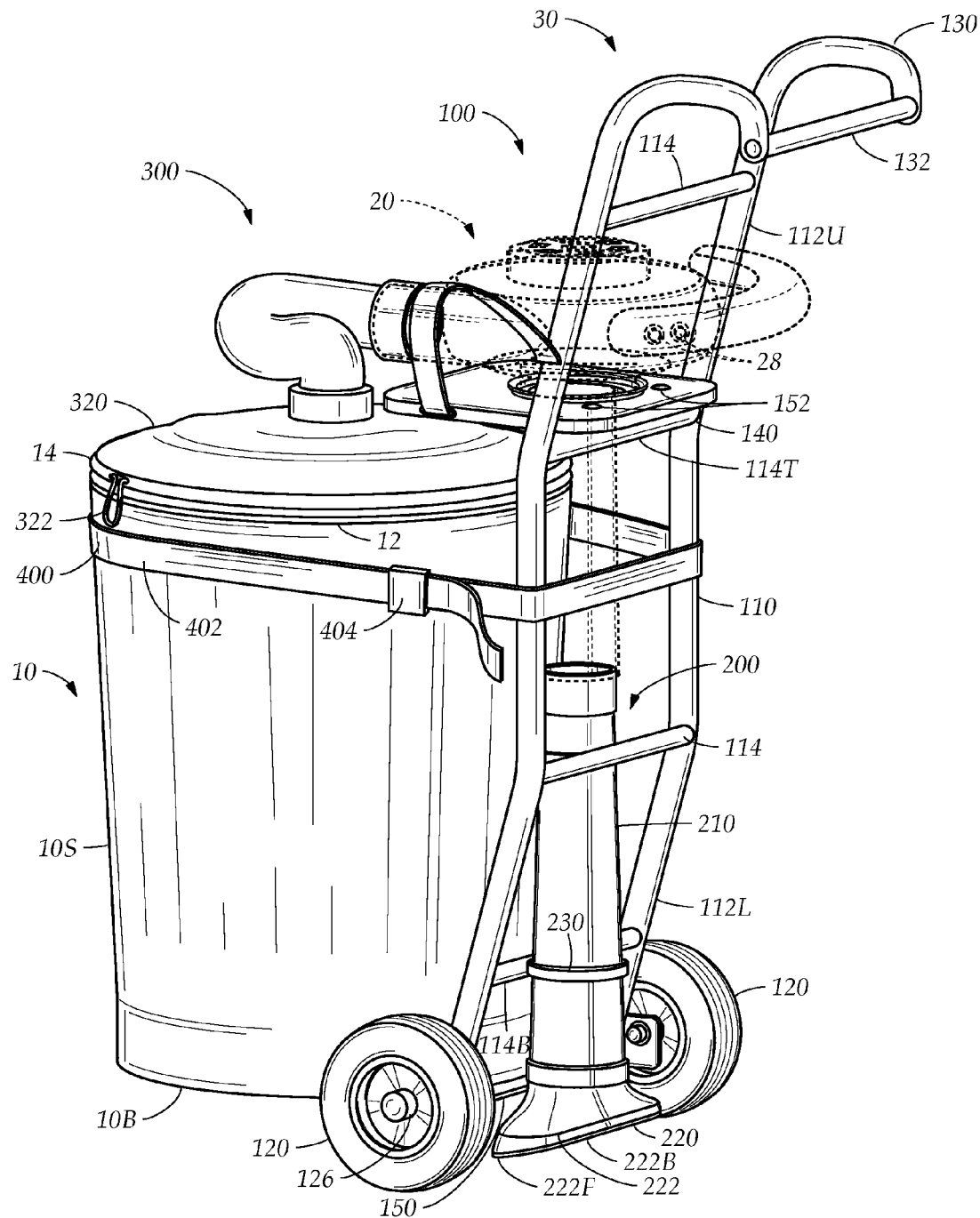
FIG. 1 is a diagrammatic perspective view of the invention from the rear with a leaf blower, shown in outline, and a trash can incorporated into the invention.

FIG. 1 illustrates an operator's trash can 10 and a leaf blower 20 with a bottom intake tube 22 incorporated into a mobile yard vacuum cart 30 that collects leaves, grass clippings, lawn debris and other plant matter. The incorporation of the operator's leaf blower 20 and trash can 10 into the invention allows an operator to collect leaves into the trash can 10 for disposal simultaneously while moving the mobile yard vacuum cart 30 across a lawn surface without lugging the leaf blower 20. The incorporation of the bottom intake tube 22 of the leaf blower 20 into the mobile yard vacuum cart 30 allows the operator to simply push the mobile yard vacuum cart 30 without having to simultaneously manipulate the intake tube 22 across the lawn surface to vacuum up the leaves. The operator only has to push the mobile yard vacuum cart 30 with one or both hands. If the leaf blower 20 has an impeller with a blade capable of chopping leaves, the mobile yard vacuum cart 30 advantageously directs the leaves into the bottom intake tube 22 and then into the impeller of the leaf blower 20 for chopping.

The mobile yard vacuum cart 30 has a vertical support assembly 100, a rear pickup assembly 200, a front discharge assembly 300 and a strap assembly 400. The mobile yard vacuum cart 30 provides a plurality of adaptors 50 in a variety of configurations to couple the pickup assembly 200 and the discharge assembly 300 to the leaf blower 20 incorporating the plurality of tubes that are supplied with the leaf blower 20. The vertical support assembly 100 has a frame 110, a pair of wheels 120, a plurality of handles 130, a blower support shelf 140, and trash can platform. The operator's trash can 10 sits on the trash can platform 150 in the front of the mobile yard vacuum cart and is strapped to the vertical support assembly 100 by the strap assembly 400. The leaf blower 20 sits on the blower support shelf 140, with the bottom intake tube 22 of the leaf blower connecting to the pickup assembly 200 at the rear of the mobile yard vacuum cart. The pickup assembly 200 is firmly attached to the vertical assembly 100 allowing the pickup assembly 200 to suck up leaves in a hands-free manner with the vacuum pulled by the leaf blower 20 through the intake tube 22. The leaf blower 20 has a front discharge tube 24 that connects to the discharge assembly 300 at the front of the mobile yard vacuum cart 30 that is attached to the trash can 10.

When the term "leaves" is used in this discussion, it includes tree leaves, grass clippings, seed pods, acorns, tree nuts, lawn debris and other plant matter typically found on the ground in a yard.

Figure 3:
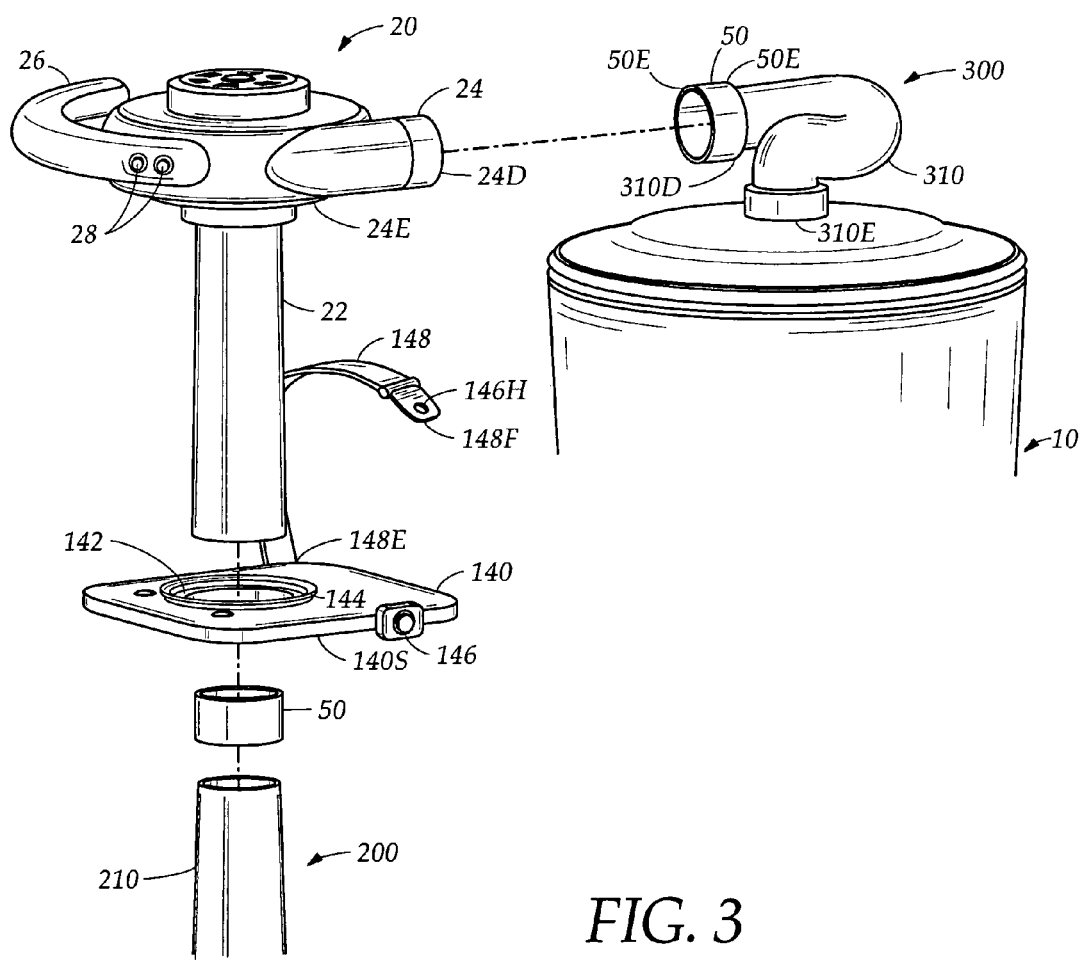
FIG. 3 is an exploded perspective view of the invention, showing the leaf blower, a blower support, a pickup assembly and a pickup conduit on a trash can shown without the vertical support assembly for clarity.

FIG. 3 shows the operator's leaf blower 20 connecting to the discharge assembly 300 and pickup assembly 200. The frame of the vertical support assembly is not shown for the sake of clarity. The leaf blower has a grip 26, and a plurality of switches 28, in addition to the bottom intake tube 22 and the front discharge tube 24. In the drawing, a handheld leaf blower 20 is shown, but the invention can be accommodate any leaf blower that is capable of blowing and vacuuming leaves and that has a bottom intake tube and a front discharge tube. When the term "leaf blower" "hand-held blower" is used in this discussion it includes leaf blowers that are carried in one or both hands or slung over a shoulder with a strap. It is inconsequential whether the leaf blower 20 is powered by gasoline, battery, AC current or other means of power or if it is usually carried by hand or by shoulder sling.

The bottom intake tube 22 of the leaf blower 20 has an outer circumference with a dimension, a pair of ends, a top end 22T that is attached to an opening for the fan to take in air and a bottom end with a rim 22B and an inner circumference attached to the pickup assembly 200. The leaf blower 20 sits on the blower support shelf 140. The blower support shelf 140 has an opening 142 with a stepped rim gasket 144 lining the opening. The stepped rim gasket 144 flexibly accommodates different circumference dimensions of intake tubes of leaf blowers from various manufacturers and holds the intake tube 22 firmly. The intake tube 22 is inserted through the stepped rim gasket 144 so that the leaf blower 20 sits level on the blower support shelf 140. The blower support shelf 140 has a plurality of sides 140S and a strap 148 with a pair of ends, a first end 148E secured to a side of the blower support shelf 140S and a second free end 148F that attaches adjustably to a second side 140S of the blower support shelf. The strap 148 secures the leaf blower 20 to the blower support shelf 140 by encircling the discharge tube 24 and adjustably attaching the second end 148F of the strap 148 to the second side 140S of the shelf 140. In the drawing, the strap 148 is shown with a buttonhole 146H at the second end 148F of the strap 148 and button 146 on the second side 140S of the blower support shelf 140. It is understood that this is a non-limiting example and that the second end 148F of the strap 148 may attach to the blower support shelf 140 by a variety of attachment means, including but not limited to, a ratchet, a buckle, a hook and loop fastener, or a snap.

Figure 5A:
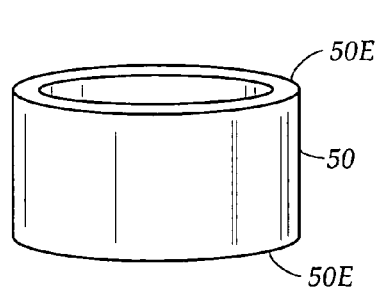
FIG. 5A is a diagrammatic perspective view of one embodiment of the adaptor for coupling the discharge tube of the leaf blower to the pickup conduit.

The discharge assembly 300 has an adaptor 50, a fabric cover 320, and a conduit 310 mounted on the fabric cover 320. The front discharge tube 24 of the leaf blower 20 connects to the conduit 310 of the discharge assembly 300 using the adaptor 50. The conduit 310 is shaped to slow down and change the air flow from a horizontal direction to a downward vertical direction. In the drawing, the conduit 310 is shown in a "S" conformation as a non-limiting example, but it is understood that numerous variations in the shape of the conduit that slows and changes the direction of the air flow are possible, while adhering to the inventive concept. The conduit 310 has a first end 310E coupled to the fabric cover 320 and second end with an outside circumference 310D. The discharge tube 24 has a first end attached to the leaf blower 24E and a second end with an outside circumference 24D. The adaptor 50, as shown in FIG. 5A, as a non-limiting example, has a pair of ends 50E. A first end 50E fits over the outside circumference at the second end 24D of the discharge tube 24 and a second end 50E fits over the outside circumference at the second end 310D of the conduit 310, connecting the two pieces. The fabric cover 320 fits over the trash can 10.

Figure 4:
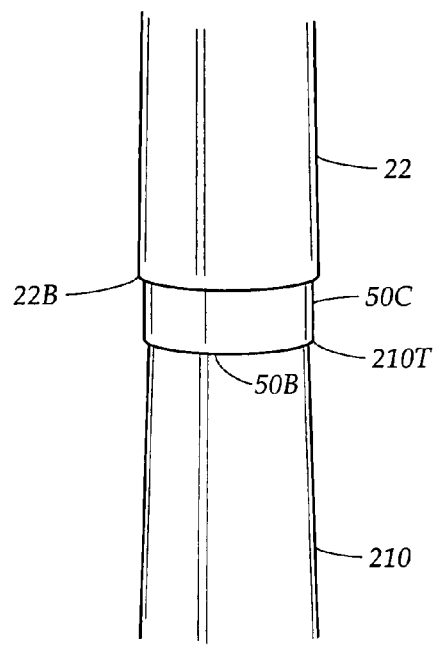
FIG. 4 is a side elevational view of an intake tube of the leaf blower and an adaptor coupled with the pickup assembly.
Figure 5B:
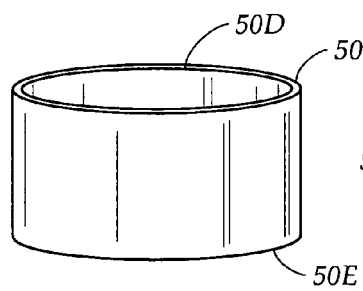
FIG. 5B is a diagrammatic perspective view of one embodiment of the adaptor for coupling the pickup assembly to the intake tube.
Figure 5C:
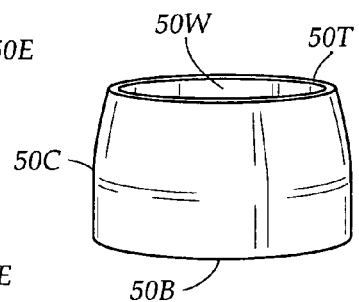
FIG. 5C is a diagrammatic perspective view of the adaptor for coupling the pickup assembly to the intake tube, similar to FIG. 5B, where the pickup assembly has an outer circumference larger than the inner circumference of the intake tube.

The bottom intake tube 22 of the leaf blower 20 is attached to the pickup assembly 200 and held in place by the adaptor 50. FIG. 4 illustrates how the intake tube 22 joins the pickup assembly. The pickup assembly has a pipe 210 that connects to the intake tube 22. The adaptor 50 has an inner circumference 50D, and a pair of rimmed ends 50E as shown in FIG. 5B, as a non-limiting example. The pipe 210 has an inner circumference 210D and a pair of ends, a top end with a rim 210T and a bottom end 210B. The top end 210T of the pipe 210 fits inside a first end 50E of the adaptor and a second end 50E of the adaptor 50 fits inside the bottom 22B of the intake tube 22B. The inner circumferences of the pipe 210, the adaptor 50 and the intake tube 22 increase vertically in the direction of the air flow so that no material jam is created by leaves becoming stuck on the rim of one of the elements. If the pipe 210 has a larger inner circumference than the intake tube 22 of the leaf blower as supplied from the manufacturer, a transition adaptor 50C that funnels the flow from the pipe connects the pieces. Such an adaptor is illustrated in FIG. 5C as a non-limiting example. The transition adaptor 50C has a smooth inside wall 50W, a bottom 50B and a tapered top 50T. The bottom 50B fits over the pipe 210 and the tapered top 50T creates a smaller circumference for the air flow that fits inside the intake tube 22. The inside smooth wall 50W of the adaptor 50C fluidly transitions from the larger circumference to the smaller circumference and eliminates any obstacle, such as a rim, to air and material flow.

FIG. 5A, FIG. 5B and FIG. 5C demonstrate various adaptors 50, as non-limiting examples, to couple the operator's leaf blower to the mobile yard vacuum cart. It is understood that there are numerous adaptors and fittings to couple tubes, pipes and conduit within the inventive concepts discussed hereinabove, that are well-known to those of ordinary skill and are beyond the scope of this discussion.

Figure 2:
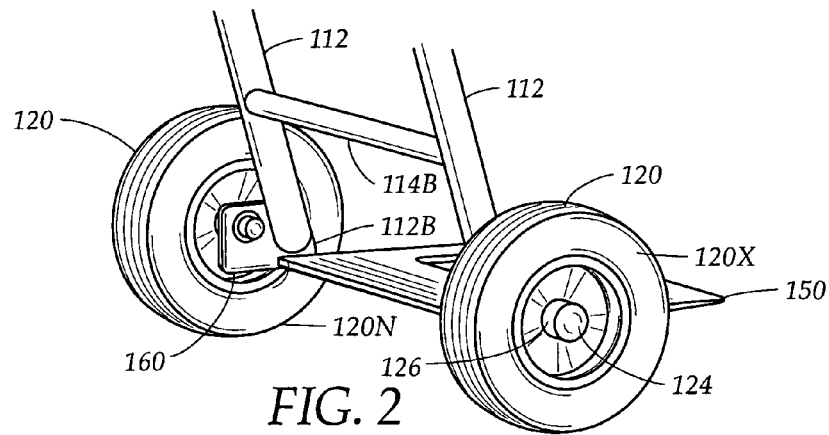
FIG. 2 is a sectional view of the invention, showing a bottom section of a vertical support assembly.

FIG. 2 shows in detail a lower section 110L of the support frame 110, the trash can platform 150, and the pair of wheels 120 of the vertical support assembly. The trash can platform 150 extends substantially perpendicular to the support frame. The pair of wheels 120 each have an outside 120X, facing away from the support frame and an inside 120N, facing the support frame 110. The support frame 110 has a pair of vertical rods 112B each with a bottom end, an upper end, a lower section, a middle section, and an upper section, and a plurality of crossbars 114 connecting a first vertical support rod 112 to a second vertical support rod 112. The crossbars 114 each have a top. A bottom crossbar 114 is illustrated. At the bottom end 112B of each vertical support rods 112 is a wheel mounting plate 160. Each wheel 120 is mounted separately on the wheel mounting plate 160, one wheel 120 at the bottom 112B of each vertical rod 112 with an axle 126 held in place by a lug nut 122 on the inside 120N of the wheel 120 and a centercap 124 on the outside 120X of the wheel 120, holding the wheel 120 in place but allowing the wheel 120 to freely rotate. The absence of a connecting axle between the pair of wheels is to allow the bottom of the rear pickup assembly to be placed between the wheels at ground level. The position of the pickup assembly in relation to the pair of wheels is illustrated by FIG. 1 as explained hereinbelow.

Referring now to FIG. 1, the support frame 110 and the rear pickup assembly 200 are shown with the pickup assembly 200 between the wheels 120 in the place of a connecting axle. The wheels 120 have individual axles 126 rather than a common connecting axle to provide space for the pickup assembly 200. The lower section 112L of the vertical rods 112 of the vertical support assembly 100 are angled away from the operator so that when the trash can 10 is in place on the trash can platform 150 there is sufficient space for the pickup assembly 200 between the pair of wheels 120. The pickup assembly 200 fits behind the bottom crossbar 114 of the support frame 110 and is held in place by a band 230 attached to the bottom crossbar 114B.

Attached to the bottom 210B of the pipe 210 of the pickup assembly 200 is an angled suction head 220. The suction head 220 has a bottom rim 222 with a front 222F and a back 222B. The bottom front 222F is longer than the bottom back 222B so that when the mobile yard vacuum cart 30 is in an upright position, the bottom back 222B is tilted away from the ground. When the mobile yard vacuum cart 30 is tilted slightly rearward toward the operator, the bottom 222 of the suction head is low, close to and substantially parallel to the ground for easy vacuuming of leaves.

The upper section 112U of the vertical rods 112 angle slightly toward the operator, and curving into a semicircle, forming a pair of handles 130. Attached at the top end 112E of the vertical rods 112 is a handle crossbar 132. The operator can grasp the handle crossbar 132 with a hand or a pair of hands, or the semicircular pair of handles 130, one handle in each of the pair of hands and push the mobile yard vacuum cart 30 around the yard.

The blower support shelf 140 is essentially parallel to the trash can support platform, and attached to the top 114T of another crossbar 114, which in turn is attached to the upper section 112U of the vertical rods 112. The blower support shelf 140 is held in place by a pair of fasteners 152.

The operator's trash can 10 has an outside 10S and has a bottom 10B that sits on the trash can platform 150. Any trash can that has an opening 14 that has a lip 12 around the opening 14 can be adopted for use in the mobile yard vacuum cart 30. The fabric cover 320 of the discharge assembly 300 fits over the opening 14 and is secured under the lip 12 of the opening. If the trash can 10 is lined with a trash can liner that covers the lip 12 of the opening 14, the fabric cover 320 is secured over the trash can liner. The fabric cover 320 is secured by a drawstring 322. It is understood that the drawstring 322 is a non-limiting example of a securing means and that securing means such as, for example, but not limited to, hook and loop fastener material, are possible within the inventive concept. The fabric cover 320 is sufficiently porous to allow air to exit the trash can while retaining the collected leaves to prevent the build up of pressure from the air flow of the leaf blower 20.

The trash can 10 is secured to the vertical support assembly 100 by a strap assembly 400. The strap assembly 400 has a strap 402 and a clasping device 404, such as, for example, but not limited to a ratchet, a buckle, or a clasp. The strap 402 is placed horizontally around the outside of the trash can 10 and vertical support assembly 100, enclosing both. The strap 402 is tightened sufficiently to hold the trash can 10 securely to the vertical support assembly 100 and fastened by the clasping device 404. In one embodiment the strap assembly is a bungee cord with a pair of ends each with a fastener. A first fastener is secured on the first vertical rod, encircles the trash can and the second fastener is secured on the second vertical rod. Variations in securing two large objects together by a strap assembly within the inventive concepts discussed hereinabove are well understood by those of ordinary skill and are beyond the scope of this discussion.

To prepare the mobile yard vacuum cart 30 for use, the operator places his or her own trash can 10 on the trash can platform 150, securing it to the vertical support assembly 100 by tightening the strap assembly 400 around it. The operator places the fabric cover 320 of the discharge assembly 300 at the front of the mobile yard vacuum cart 30 over the opening 14 of the trash can 10 and tightens the drawstring 322. The operator places his or her own leaf blower 10 on the blower support shelf 140 and connects the front discharge tube 24 to the conduit 310 on the discharge assembly 300 at the front of the mobile yard vacuum cart 30 using the adaptor 50 that fits the ends of the conduit 310 and the front discharge tube 24. The operator tightens the strap 148 of the blower support shelf 140 around the discharge tube 24.

The operator connects the bottom intake tube 22 to the pipe 210 of the pickup assembly 200 at the rear of the mobile yard vacuum cart 30 using the adaptor 50 that transitions the inner circumference of the pipe 210 to the inner circumference of the intake tube 22 without creating an obstacle to the flow. The mobile yard vacuum cart 30 is ready for use.

To use the mobile yard vacuum cart 30, the operator turns the leaf blower 20 on and sets the fan speed, if a speed switch is provided, using the plurality of switches 28 provided on the leaf blower 20. The operator grasps the pair of handles 130 in each hand or grasps the handle crossbar 132 in one or two hands and tilts the mobile yard vacuum cart 30 backwards towards the operator until the suction head 220 is parallel to the ground. The operator pushes the mobile yard vacuum cart 30 over the ground, sucking up leaves. In one embodiment, the operator pushes the mobile yard vacuum cart with one hand and uses a hand-held rake to push leaves closer to the suction head. In one embodiment, a rake head and handle is inserted inside the pickup assembly to assist the suction head in collecting the leaves. The leaves pass through the impeller of the leaf blower 20 and if the impeller is so designed, chops the leaves for mulching and composting. When the trash can 10 is full, the operator turns the leaf blower 20 off, looses the drawstring 322 of the fabric cover 320 and the strap assembly 400, removes and empties the trash can 10. To continue yard cleanup, the operator restores the trash can 10 to the trash can platform 150, places the fabric cover 320 over the opening 14 of the trash can 10, secures the drawstring 322, and turns on the leaf blower 20.

When the operator is finished, the trash can 10 is removed and emptied as described hereinabove. The leaf blower 20 may be stored attached to the blower support shelf 140 or removed. To remove the leaf blower 20, the discharge tube 24 is uncoupled from the conduit 310 on the discharge assembly 300, the intake tube 22 is uncoupled from the pickup assembly 200 and the strap 148 securing the leaf blower 20 to the blower support shelf 140 is undone.

In conclusion, herein is presented a mobile yard vacuum cart that incorporates an operator's trash can and leaf blower for the collection of leaves. The invention is illustrated by example in the drawing figures, and throughout the written description. It should be understood that numerous variations are possible, while adhering to the inventive concept. Such variations are contemplated as being a part of the present invention.

What is claimed is:

1. A mobile yard vacuum cart, for use with a hand-held leaf blower having a housing having a handle, a front discharge tube, and a bottom intake tube, and for use with a trash can having a lipped opening, comprising:
    a vertical support assembly having a frame with a bottom, a pair of wheels attached to the frame bottom, a trash can platform extending substantially perpendicularly from the frame bottom for supporting the trash can, and a blower support shelf attached to the frame for selectively supporting and securing the blower housing;
    a pickup assembly having a suction head and a pipe having a bottom end connected to the suction head, the pipe also having a top end adapted for removably connecting to the intake tube of the leaf blower;
    a discharge assembly including a fabric cover to prevent the build up of pressure and a conduit having a first end adapted for removably connecting to the discharge tube of the leaf blower and having a second end connecting to the fabric cover, the fabric cover is secured onto the lipped opening of the trash can by a means for securing the fabric cover; and
    a strap assembly with a strapping means for selectively attaching the trash can to the vertical support assembly.

2. The mobile yard vacuum cart as described in claim 1, wherein the suction head has a long front, a short back, and an angled bottom rim, such that when the suction head is tilted rearwardly, the angled bottom rim is substantially parallel to the ground.

3. The mobile yard vacuum cart as described in claim 1, wherein the fabric cover is secured on the lipped opening of the trash can by a drawstring.

4. The mobile yard vacuum cart as described in claim 1, wherein the fabric cover is sufficiently porous to allow air to flow out.

5. The mobile yard vacuum cart as described in claim 1, wherein the frame has a pair of parallel vertical rods connected by a plurality of crossbars, the rods each having a pair of lower sections angled away from an operator and an upper section angled toward the operator and the pair of upper sections having a pair of semicircular handles joined by a handle crossbar, the handle crossbar for grasping with a hand.

6. The mobile yard vacuum cart as described in claim 5, wherein the pair of wheels each have an individual axle to create a space for the pickup assembly between the pair of wheels.

7. The mobile yard vacuum cart as described in claim 6, wherein the parallel vertical rods have a bottom and at the bottom of each is mounted a wheel mounting plate for mounting the individual axle of a wheel.

8. The mobile yard vacuum cart as described in claim 1, wherein the intake tube has an outer circumference having a dimension and the blower support shelf has an opening and a stepped rim gasket surrounding the opening, such that the stepped rim gasket adjustably fits the circumference of the outer diameter of the intake tube when the intake tube is selectively placed through the opening.

9. The mobile yard vacuum cart as described in claim 8, wherein an air flow moves upwardly from the ground through the pickup assembly pulled by a vacuum created by the leaf blower and blown by the leaf blower into the discharge assembly.

10. The mobile yard vacuum cart as described in claim 1, wherein the pipe is coupled to the bottom intake tube by an adaptor that fluidly transitions the air flow in an upwardly direction.

11. The mobile yard vacuum cart as described in claim 10, wherein the pipe has an outer circumference with a dimension, the intake tube has an inner circumference with a dimension, the adaptor has a first end that is straight and a second end that is tapered, and the dimension of the outer circumference of the pipe is greater than the dimension of the inner circumference of the intake tube, and the adaptor fluidly transitions the air flow in an upwardly direction, coupling the pipe and intake tube with the straight end over the outer circumference of the pipe and the tapered end inside the intake tube.

12. A method of preparing the mobile yard vacuum cart for use, the mobile yard vacuum cart having a hand-held leaf blower having a housing having a handle, a front discharge tube, and a bottom intake tube, a trash can with a lipped opening, a vertical support assembly with a trash can platform and blower support shelf with a means for selectively securing the leaf blower to the support shelf, a pickup assembly, a discharge assembly with a means for selectively securing the discharge assembly to the trash can, a plurality of adaptors, and a means for selectively securing the trash can to the vertical support assembly, comprising:

placing the trash can on the trash can platform;
fastening tightly the means for selectively securing the trash can to vertical support assembly;
placing the discharge assembly over the lipped opening of the trash can and tightening the means for selectively securing the discharge assembly to the trash can;
placing the leaf blower on the blower support shelf and fastening with the means for selectively securing the leaf blower to the blower support shelf; and
connecting the bottom intake tube of the leaf blower to the pickup assembly with a first adaptor and the discharge tube of the leaf blower to the discharge assembly with a second adaptor.

13. A method of using the mobile yard vacuum cart to pick up leaves, the mobile yard vacuum cart having a leaf blower, a vertical support assembly with a plurality of handles, a trash can strapped to the vertical support assembly, a pickup assembly with an angled suction head, a discharge assembly, comprising:

powering on the leaf blower;
tilting rearward the mobile yard vacuum cart until the suction head is parallel to the ground by grasping the handles of the vertical support assembly and pulling rearward;
pushing the mobile yard vacuum cart over the ground, simultaneously sucking up leaves through the pickup assembly and discharging the leaves through the discharge assembly into the trash can;
powering off the leaf blower; and
removing the trash can from the vertical support assembly to dispose of the leaves.

\* \* \* \* \*